United States Patent [19]
Holzrichter

[11] 3,848,945
[45] Nov. 19, 1974

[54] BRIGHTNESS LIMITING CIRCUIT

[75] Inventor: Robert A. Holzrichter, Chicago, Ill.

[73] Assignee: Warwick Electronics Inc., Chicago, Ill.

[22] Filed: Mar. 16, 1973

[21] Appl. No.: 342,314

[52] U.S. Cl. .................... 315/30, 315/20
[51] Int. Cl. .................... H01j 29/70
[58] Field of Search .......... 315/20, 27 R, 27 TD, 28, 315/29

[56] References Cited

UNITED STATES PATENTS

| | | | |
|---|---|---|---|
| 3,402,316 | 9/1968 | Gausman et al. | 315/20 |
| 3,466,390 | 9/1969 | Inamiya et al. | 315/30 |
| 3,619,705 | 11/1971 | Waybright | 315/30 |
| 3,629,645 | 12/1971 | Taylor | 315/20 |

*Primary Examiner*—Richard A. Farley
*Assistant Examiner*—J. M. Potenza
*Attorney, Agent, or Firm*—Hofgren, Wegner, Allen, Stellman & McCord

[57] ABSTRACT

A brightness limiting circuit for a television receiver reduces anode current in a CRT to prevent damage to the horizontal output stage by controlling the biasing of a transistor in series between the video amplifier and the chroma demodulator which drives the cathodes of the CRT. The transistor bias is developed from dual sensing circuits, one circuit comprising an RC network responsive to an excessive average anode current, and the other circuit comprising a switching network responsive to instantaneous peaks of anode current.

13 Claims, 1 Drawing Figure

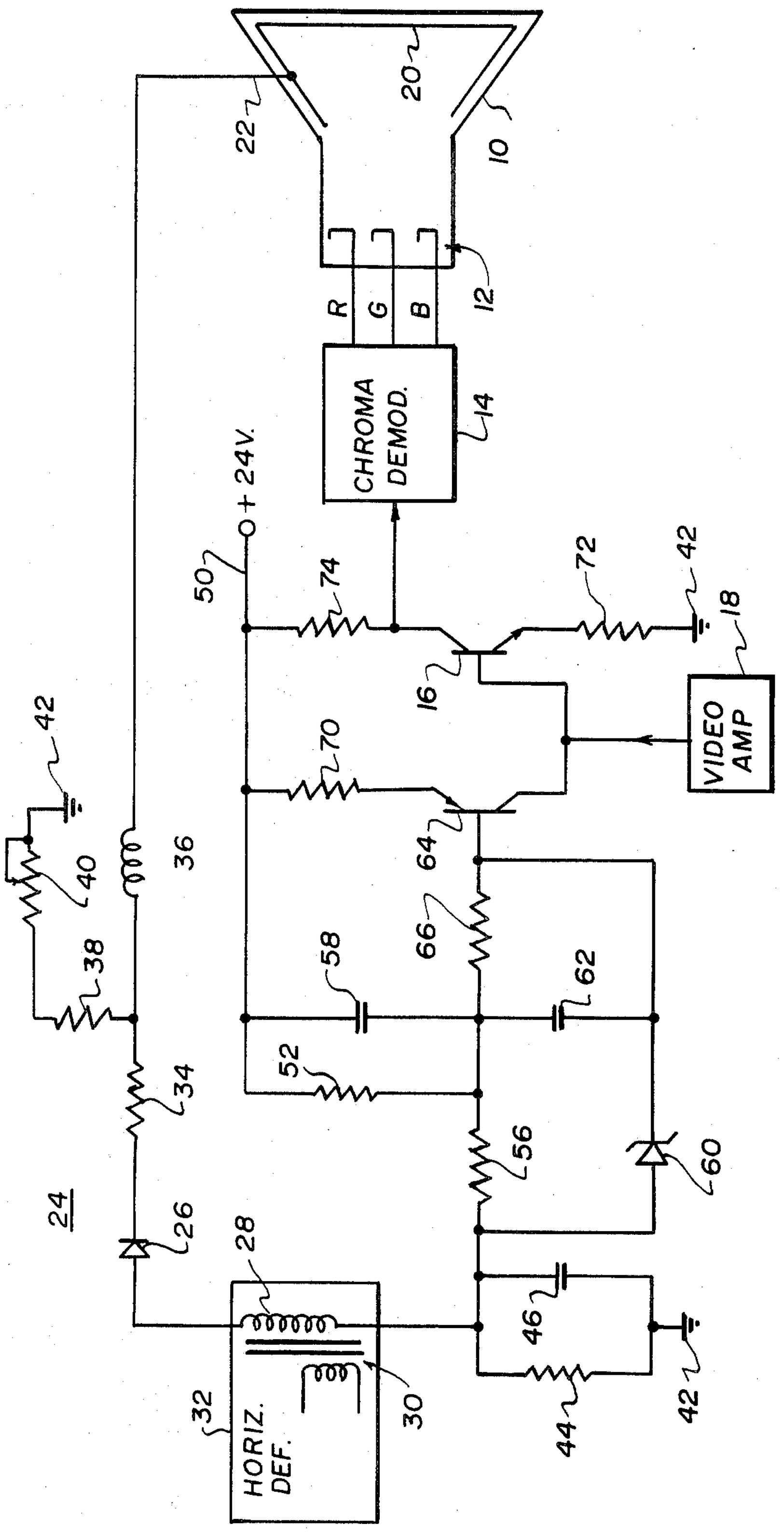
CHROMA DEMOD.
VIDEO AMP
HORIZ. DEF.
+ 24V.
R
G
B

BRIGHTNESS LIMITING CIRCUIT

BACKGROUND OF THE INVENTION

This invention relates to a brightness limiting circuit for a television receiver.

Various television circuits have been developed to reduce beam intensity in response to an undesirable increase in average beam intensity. The average intensity of the cathode ray beam has been sensed by monitoring anode current from the high voltage supply for the cathode ray tube (CRT). The sensed average value then controls a signal path which applies the video signal to the cathode ray tube. Examples of such prior circuits are disclosed in U.S. Pat. No. 3,009,989 issued Nov. 21, 1961, U.S. Pat. No. 3,465,095 issued Sept. 2, 1969, and U.S. Pat. No. 3,644,669 issued Feb. 22, 1972. All such brightness limiting circuits have been responsive to the average value of the beam current. In fact, the prior art has taught that only the average beam intensity should be affected, becaise picture highlights are conveyed by instantaneous high beam intensities, and any brightness limiting circuit must not adversely affect the reproduction of picture highlights.

Prior brightness limiting circuits have therefore been unable to protect the horizontal output stage from the deleterious effects of instantaneously high current spikes which can occur in beam current when, for example, some television receivers are switched from channel to channel. Normal beam current may go as high as 1 milliampere or so, but during the period of channel switching, beam current can sometimes increase to 15 or 20 milliamperes. This demands a very high current from the horizontal output stage, and can cause components to fail.

SUMMARY OF THE INVENTION

In accordance with the present invention, a brightness limiting circuit is provided which limits average beam current and also is effective to overcome the problem of beam current of instantaneous high peak values. For this purpose, a monitoring circuit includes one section which is responsive to an excessive average beam current, and another section which is responsive to beam current of predetermined instantaneous high value. In response to either monitoring section, a transistor circuit which feeds video to a chroma demodulator causes the beam current to be reduced.

One object of this invention is the provision in a television receiver of a brightness limiting circuit responsive to both excessive average beam current and excessive instantaneous beam current spikes to reduce the anode current to a CRT.

Another object of this invention is the provision in a television receiver of a brightness limiting circuit which includes a switching stage responsive to instantaneous anode current spikes to immediately reduce beam current as by reducing cathode drive to a CRT.

Other advantages and features of the invention will be apparent from the following description, and from the drawing. While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values will be given for certain of the components in order to disclose a complete, operative embodiment of the invention. However, it should be understood that such values are merely representative and are not critical unless specifically so stated.

BRIEF DESCRIPTION OF THE DRAWING

The single FIGURE is a partly block and partly schematic diagram of the brightness limiting circuit as incorporated in a color television receiver.

DESCRIPTION OF THE PREFERRED EMBODIMENT

In the single FIGURE, a color television receiver is illustrated in which a three beam cathode ray tube (CRT) 10 includes three cathodes 12 driven by the red R, green G, and blue B outputs of a chroma demodulator 14. A video input to the chroma demodulator is provided from a brightness limiting transistor 16 or other controllable conduction device which is in series with the output from a video amplifier 18.

The CRT 10 includes an ultor electrode or final anode 20 which is supplied high voltage, on the order of 20 to 30 kilovolts, over a high voltage lead 22. The high voltage lead 22 is coupled to a high voltage anode supply 24 which includes a high voltage rectifier 26 having an anode coupled to a high voltage winding 28 of a horizontal flyback transformer 30 in a horizontal deflection output stage 32. The rectified horizontal flyback pulses are coupled through a series resistor 34 and an inductor 36 to the high voltage lead 22. The junction between resistor 34 and inductor 36 is coupled through a resistor 38 and a focus potentiometer 40 to a ground reference source 42.

The side of the high voltage winding 28 opposite the side coupled to high voltage rectifier 26 is coupled to ground 42 through a beam current filtering network, comprised of a 100 kilohm resistor 44 in parallel with a 0.22 microfarad capacitor 46. The color television receiver includes additional stages of a conventional nature, not illustrated for clarity, which operate in a known manner in order to cause the CRT 10 to scan a raster and reproduce a color image.

The total CRT anode current which is required from the high voltage supply 24 generally flows to the junction between high voltage winding 28 and the RC network 44, 46, from a low voltage supply line 50, carrying a voltage such as +24 volts DC. The DC current from line 50 flows through a 560 ohm resistor 52 in series with a 1.5 kilohm resistor 56.

An excessive average beam current sensing circuit is formed by resistor 52 in combination with a 50 microfarad capacitor 58 which is in parallel therewith. An instantaneous excessive peak beam current sensing circuit is formed by the resistor 56 in combination with a semiconductor switching device, such as a voltage breakover switching device in the form of a Zener diode 60 which has a breakover voltage of 6.8 volts. The anode of the voltage breakover diode 60 is coupled to one side of resistor 56, and its cathode is coupled through a 0.01 microfarad capacitor 62 to the opposite side of resistor 56.

To control the maximum drive current which can be supplied to CRT 10, a brightness limiting controllable conduction device as a transistor 64 has its base coupled directly to Zener diode 60, and through a 4.7 kilohm resistor 66 to a junction which is in the series path for the total anode current flow from the low voltage supply to the high voltage winding 28. The emitter of transistor 64 is coupled through a 270 ohm resistor 70 to low voltage supply 50. The base of brightness limiting transistor 16 is directly connected to the collector of transistor 64, and to the output from video amplifier 18. The emitter of transistor 16 is coupled through a 1 kilohm resistor 72 to ground 42, whereas the collector is coupled through a 3.9 kilohm load resistor 74 to low voltage line 50. The collector is also directly coupled to the chroma demodulator 14.

When transistor 64 is driven on, it further forward biases transistor 16. In the illustrated system a low voltage at the collector of transistor 16 produces cut-off of the beam current in the cRT 10. Of course, the output from the transistor 16 could be inverted, if desired, if chroma demodulator 14 operated at a different signal level. When transistor 16 is driven hard into conduction, the signal from video amplifier 18 is ineffective to control the beam current from cathodes 12, and the beam current in turn is directly proportional to the anode current which appears on high voltage lead 22.

In operation, the voltage across resistor 52, which generally corresponds to the total CRT anode current flow, is integrated by capacitor 58 to develop a control signal having an average DC level which is proportional to the average beam current level of the CRT. The control voltage is applied to the base of transistor 64 through resistor 66, and only an excessive average beam current creates a bias voltage sufficient to reduce the cathode drive. The time constant of the integrating circuit including capacitor 58 and resistor 52 is chosen to be large so as to sense the average value of the scan current over several frames.

When the television receiver is switched from channel to channel, very high peaks of beam current may be encountered. For example, normal beam current may be as high as one milliampere, but during the channel switching period, the beam current can sometimes increase to 15 or 20 milliamperes. This very high current can cause components to fail in the horizontal output stage 32 and in the high voltage supply 24. When such high peaks of current are drawn by the CRT final anode 20, the voltage across resistor 56 increases instantaneously, and this increase breaks over or switches on Zener diode 60. The diode 60 when in its high conduction state directly controls the base current in transistor 64, causing the transistor to be driven hard into conduction, which in turn causes transistors 16 to conduct and thus instantaneously decreases the beam current.

Capacitor 62 is included in the instantaneous beam current switching circuit to eliminate a problem known as "jail bars" in the video signal. Zener diode 60 is somewhat leaky in the reverse direction, and during a normal video signal, some voltage is developed across the Zener diode which would tend to drive the directly coupled transistor 64 into conduction. To eliminate this problem, capacitor 62 integrates instantaneous small changes across resistor 66 which are due to reverse leakage through the Zener diode, preventing the leakage from biasing transistor 64 into conduction. The value of capacitor 62 is chosen to be much smaller than the value of capacitor 58 so as not to interfere with the fast clipping function zener diode 60 which forms a part of the instantaneous excessive beam current sensing circuit. Other modifications which can be made will be apparent to those skilled in the art.

I claim:

1. In a television receiver including a cathode ray tube having cathode means and anode means, and a high voltage anode power supply connected to said anode means to provide anode current which is related to cathode current, a limiting circuit responsive to both instantaneous peak current and average current in the cathode ray tube, comprising:

means actuable for limiting the current to the cathode ray tube, peak current monitoring means responsive to a sensed instantaneous peak cathode ray tube current for actuating said limiting means, and average current monitoring means responsive to a sensed average cathode ray tube current for actuating said limiting means.

2. The limiting circuit of claim 1 wherein said peak current monitoring means comprises switching means for actuating said limiting means only when the instantaneous peak cathode ray tube current exceeds a predetermined value.

3. The limiting circuit of claim 2 wherein said switching means comprises resistive means connected with the high voltage anode power supply to produce a voltage drop thereacross proportional to current to the anode means, and a semiconductor breakover device coupled to said resistive means and responsive when the voltage drop exceeds a predetermined value for actuating the limiting means.

4. The limiting circuit of claim 3 wherein the semiconductor breakover device has a reverse leakage which undesirably tends to actuate the limiting means, and capacitor means for integrating instantaneous small changes produced by the reverse leakage.

5. The limiting circuit of claim 1 wherein the limiting means comprises a controllable conduction device for controlling the cathode beam current in the cathode ray tube, the high voltage anode power supply comprises a high voltage winding of a flyback transformer, rectifier means, a source of reference potential, and circuit means connecting the high voltage winding and the rectifier means in series between the source of reference potential and the anode means of the cathode ray tube to supply anode current thereto, the average current monitoring means and the peak current monitoring means being responsive to sensed anode current flowing in the circuit means.

6. The limit circuit of claim 5 wherein the average current monitoring means includes first resistive means connected in said series circuit means for developing thereacross a voltage proportional to anode current, and capacitor means coupled to said first resistive means for producing for the controllable conduction device a control signal proportional to the excessive average amount of anode current through the first resistive means.

7. The limiting circuit of claim 6 wherein the peak current monitoring means includes second resistive means connected in said series circuit means for developing thereacross a voltage proportional to anode current, and switching means coupled to said second resistive means and responsive only to a voltage in excess of a predetermined value for actuating the controllable conduction device.

8. The limiting circuit of claim 7 wherein the switching means comprises a Zener diode having one side coupled to said second resistive means and the other side coupled to the base of transistor means corresponding to the controllable conduction device.

9. In a television receiver including a cathode ray tube having cathode means and anode means, and a high voltage anode power supply coupled to said anode means, a brightness limiting circuit, comprising:

semiconductor means connected in series with a circuit for supplying cathode current to limit cathode current flow from the cathode ray tube in response to a control signal, instantaneous peak sensing means for sensing instantaneous peaks of cathode ray tube current, including control means responsive to an instantaneous current peak in excess of a predetermined value for instantaneously generating said control signal to immediately limit cathode ray tube current.

10. The brightness limiting circuit of claim 9 wherein said instantaneous peak sensing means includes a voltage breakover device corresponding to said control means and switchable to a conduction state which produces said control signal, resistive means having a voltage drop thereacross which controls the voltage breakover device, and means connecting said resistive means in a circuit which has a current flow proportional to anode current to the cathode ray tube.

11. The brightness limiting circuit of claim 10 wherein said high voltage anode power supply includes a high voltage winding of a flyback transformer, rectifier means for coupling one side of the high voltage winding to the anode means of the cathode ray tube, and said circuit connecting means connects the other side of the high voltage winding to a source of reference potential to cause the anode current to flow in series through the resistive means.

12. The brightness limiting circuit of claim 11 wherein the output of the voltage breakover device is directly coupled to the semiconductor means to limit cathode current flow substantially instantaneously in response to voltage breakover of the voltage breakover device.

13. The brightness limiting circuit of claim 9 including means for sensing the average current to the cathode ray tube, and means responsive to an excessive sensed average current for developing a second control signal for the semiconductor means.

* * * * *